US007550551B2

(12) United States Patent
Timberlake et al.

(10) Patent No.: US 7,550,551 B2
(45) Date of Patent: Jun. 23, 2009

(54) BROMINATED FLAME RETARDANT

(75) Inventors: Larry D. Timberlake, West Lafayette, IN (US); William R. Fielding, West Lafayette, IN (US); Sumit Mathur, West Lafayette, IN (US); Mark V. Hanson, West Lafayette, IN (US)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 11/893,944

(22) Filed: Aug. 16, 2007

(65) Prior Publication Data
US 2008/0051505 A1 Feb. 28, 2008

Related U.S. Application Data

(60) Provisional application No. 60/839,137, filed on Aug. 22, 2006.

(51) Int. Cl.
C08G 65/38 (2006.01)
C08G 18/77 (2006.01)

(52) U.S. Cl. .................... 528/212; 264/176.1; 264/219; 524/100; 524/115; 524/142; 524/538

(58) Field of Classification Search .............. 264/176.1, 264/219; 524/100, 142, 115, 538; 528/212
See application file for complete search history.

(56) References Cited

U.S. PATENT DOCUMENTS 4,141,880 A 2/1979 Nametz et al. ................. 260/37
4,341,890 A 7/1982 Lindvay
5,115,010 A 5/1992 Sakai et al. ................... 524/410
6,864,343 B2 3/2005 Onishi .......................... 528/86
6,924,332 B2 8/2005 Onishi et al. ................. 524/189

FOREIGN PATENT DOCUMENTS

| DE | 3000221 A1 | 7/1981 |
| EP | 1 391 475 A1 | 2/2004 |
| JP | 55-65226 | 5/1980 |
| JP | 63-104807 | 5/1988 |
| JP | 3-188161 | 8/1991 |
| JP | 04-356448 | 12/1992 |
| JP | 6-192568 | 7/1994 |
| JP | 6-65706 | 8/1994 |
| JP | 7-61659 | 7/1995 |
| JP | 07-278290 | 10/1995 |
| JP | 2945041 | 6/1999 |
| JP | 2976859 | 9/1999 |
| PL | 187223 | 11/1998 |

OTHER PUBLICATIONS

Kagakukai Shi, Japanese Journal fo Chemical Society, (3), 403-408 (1977).
R.C. Nametz, 25 Soc. Plast. Eng. Tech. Pap., 488-491 (1979).
P.H. Burleigh et al., 7(1) J. Fore Retard Che, 47-57 (1980).
P.H. Burleigh et al., 4 Proc. Int. Conf. Fire Saf. 279-293 (1979).

*Primary Examiner*—Terressa M Boykin
(74) *Attorney, Agent, or Firm*—James Sher

(57) ABSTRACT

A process for preparing a polybromoaryl ether comprising adding to a solvent for the polybromoaryl ether a mixture of (1) at least one compound of the structure HO—Ar—$X_1$, $X_2$, $X_3$, $X_4$, $X_5$, wherein Ar is an aryl group and $X_1$, $X_2$, $X_3$, $X_4$, and $X_5$ are independently selected from hydrogen and bromine, provided that at least one of $X_1$, $X_2$, $X_3$, $X_4$, and $X_5$ is bromine, (2) at least one alkali or alkaline metal hydroxide, and (3) at least one polymerization initiator, wherein the solvent for the polybromoaryl ether is a non-solvent for alkali metal bromides.

5 Claims, 1 Drawing Sheet

SEM Micrographs of Glass-Reinforced PA6T/6,6 Formulations Containing
Different Flame Retardants Compound 2 Formulation   BPS Formulation

BROMINATED FLAME RETARDANT

I claim the benefit under Title 35, United States Code, § 120 to U.S. Provisional Application No. 60/839,137, filed Aug. 22, 2006, entitled BROMINATED FLAME RETARDANT.

BACKGROUND OF THE INVENTION

1. Field of the Invention

The present invention relates to flame retardants for use in resins and methods of use of the flame retardants. Specifically, the invention relates to polybromoaryl ethers and the methods of use of said ethers as flame retardant additives for use in resins, including polyamides, and methods of use of the flame retardants.

2. Description of the Background Art

Various additive materials are used in formulations with polymer resins during compounding to augment or affect the properties of the final compositions. Among these additives, flame retardants are added to polymer resins to reduce the flammability. The use of flame retardant materials may adversely affect the polymer properties, depending on the specific system being used. The effect of the flame retardants on these polymer properties can sometimes be minimized by using a more efficient flame retardant that can be utilized at a lower lead level verses other flame retardant materials. The class of flame retardants known as polybromoaryl ethers are more efficient in polyamide resins than the standard brominated polystyrene type of materials and can be used at a lower loading to achieve the same level of flame retardancy, while having less of an impact on the overall properties of the system.

These polybromoaryl ethers are very thermally stable materials. As a result, they provide improved thermal properties to the resin systems in which they are employed. By producing a polybromoaryl ether with lower ionic impurities, the improved thermal properties can be realized even further. This provides improved properties, such as producing less "off-gassing" during injection molding and by also providing an improvement by minimizing the "blistering" of parts made with these types of materials.

The molecule commercially known as PO-64, or PO-64P was invented in our laboratories in the late 1970s (then known as Velsicol Chemical Corporation) and was promoted for use in polyamides. This material is a polybromoaryl ether and was made by the polymerization of tribromophenol in an aqueous medium and is still made today by various other companies. Initial disclosures of this material, previously known as Firemaster 935, describe in detail the advantages of using this product in polyamide and polyester applications. See, for example, R. C. Nametz et al., 25 Soc. PLAST. ENG. TECH.PAP., 488-91 (1979); P. H. Burleigh et al., 7(1) J. FIRE RETARD. CHEM. 47-57 (1980); and P. H. Burleigh et al., 4 PROC. INT. CONF. FIRE SAF. 279-93 (1979).

The condensation products of brominated phenols are made by various processes involving either aqueous-based processes or two-phased water-solvent processes. U.S. Pat. No. 4,141,880 discloses processes which are organic solvent-aqueous based. Initiators such as benzoyl peroxide are used to initiate polymerization of the brominated phenolates using water and an organic solvent such as chloroform or 1,2,4-trichlorobenzene.

U.S. Pat. No. 4,141,880 discloses a flame retarded, non-blooming polyamide composition comprised of a condensation product derived from brominated phenols and phenolates. These compositions provide a material having good thermal stability. The patent focuses on polyamide compositions. In the processes disclosed a number of solvents are discussed and tetrahydrofuran is mentioned, but the focus is on organic-aqueous based reaction systems or the use of other high-boiling solvents. The advantages of using tetrahydrofuran, recognized by the present invention, were not recognized and presented in any manner in this patent.

In 3 NIPPON KAGAKUKAI SHI 403-08 (1977) a method is discussed in which copper (II) salts are used as catalysts for the condensation polymerization of 2,4,6-tribromophenol catalyzed by the DMF-CuCl$_2$ complex. Several solvents and bases are described for this process. Tetrahydrofuran is disclosed as being used in the purification of the product. The crude polymerization product is precipitated into acidic methanol. The product is purified by dissolving the crude product in tetrahydrofuran. The solution is then filtered and the product re-precipitated into methanol.

Japan Application Number 06-068433 discloses a process to prepare brominated polyphenylene ether wherein a brominated phenolate in water is polymerized with an initiator system comprising a halogenated organic compound that becomes cationic in a nitric acid or silver nitrate reaction.

All disclosed methods to make the polymer suffer from having the polymer precipitate from water, trapping impurities, or from the need to water-wash out bromide salts and precipitate the polymer in a selected non-solvent, or the method is simply not practical industrially. A need exists for a process in which the material can be made with low ionic impurities without requiring the separate washing clean-up step.

Certain electrical components are required to withstand increased processing temperatures because of the higher temperature requirements of lead-free solder during the solder reflow process. This is especially true for components that utilize surface-mount technology (SMT). The processing results in component parts sometimes forming bubbles, or blisters on the surface of the part after the reflow process if the materials are not thermally robust.

The current invention provides a thermally stable flame retardant system and reduces some of the adverse effects of processing on the final polymer.

SUMMARY OF THE INVENTION

The present invention relates to the process to prepare polybromoaryl ether, and the polybromoaryl ether prepared by the process comprising adding to a solvent for the polybromoaryl ether a mixture of (1) at least one compound of the structure $$\text{HO—Ar—}X_1X_2X_3X_4X_5 \qquad \text{(I)}$$

wherein Ar is an aryl group and $X_1$, $X_2$, $X_3$, $X_4$, and $X_5$ are independently selected from the group consisting of hydrogen and bromine, provided that at least one of $X_1$, $X_2$, $X_3$, $X_4$, and $X_5$ is bromine, (2) at least one alkali or alkaline metal hydroxide, and (3) at least one polymerization initiator, wherein said solvent for the polybromoaryl ether is a non-solvent for alkali or alkaline metal bromides. The mixture is allowed to react to polymerize compound I and form the polybromoaryl ether and at least one alkali or alkaline metal bromide by-product. The polymerization of compound I is then quenched and then the insoluble alkali or alkaline metal bromide by-product is separated from the soluble polybromoaryl ether. Preferably, the invention relates to a process for making the compound without the need for a separate purification step.

The current invention also relates to a composition comprising a mixture of a polymeric resin and the polybromoaryl ether prepared by the process of the current invention.

The polybromoaryl ether compound of the present invention is of the following general formula:

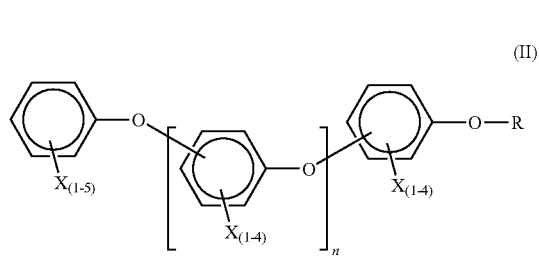

wherein R is H, alkali or alkaline earth metals and X represents a bromine atom from 1 through full substitution on the aryl rings.

The present invention includes flame retardants where the general formula above is an ortho- or para-substituted mixture, where the substitution pattern is not defined. The invention includes a method of using the compound as a flame retardant additive in polymer resins to provide improved thermal stability, improved blister resistance, improved polymer compatibility, and reduced flame retardant and synergist load levels to achieve Underwriters Laboratories (UL) 94 V-0 classification.

DETAILED DESCRIPTION OF THE PREFERRED EMBODIMENTS

Figure 1:
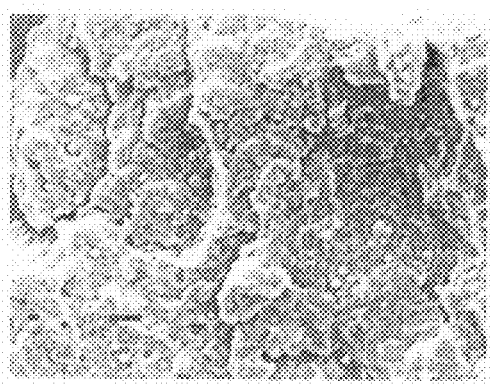
FIG. 1 shows Scanning Electron Micrograph (SEM) images of a glass-reinforced PA6T/6,6 formulation containing a flame retardant of Comparative Example 5 (Compound 2) and a glass-reinforced PA6T/6,6 formulation containing a flame retardant of brominated polystyrene (BPS).
Figure 1:
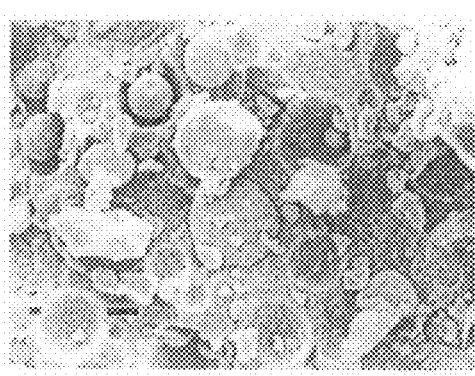

The present invention relates to the process to prepare a polybromoaryl ether, the polybromoaryl ether prepared by the process comprising adding to a solvent for the polybromoaryl ether a mixture of (1) at least one compound of the structure $$HO—Ar—X_1X_2X_3X_4X_5 \qquad (I)$$

wherein Ar is an aryl group and $X_1$, $X_2$, $X_3$, $X_4$, and $X_5$ are independently selected from the group consisting of hydrogen and bromine, provided that at least one of $X_1$, $X_2$, $X_3$, $X_4$, and $X_5$ is bromine, (2) at least one alkali or alkaline metal hydroxide, and (3) at least one polymerization initiator, wherein said solvent for the polybromoaryl ether is a non-solvent for alkali or alkaline metal bromides. The mixture is allowed to react to polymerize compound I and form the polybromoaryl ether and at least one alkali or alkaline metal bromide by-product. The polymerization of compound I is then quenched and then the insoluble alkali or alkaline metal bromide by-product is separated from the soluble polybromoaryl ether. Preferably, the invention relates to a process for making the compound without the need for a separate purification step.

The current invention also relates to a composition comprising a mixture of a polymeric resin and the polybromoaryl ether prepared by the process of the current invention.

The invention includes the compound of the following general formula:

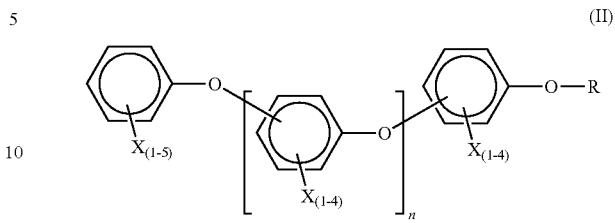

wherein R is hydrogen, alkali or alkaline earth metals and X represents the degree of bromination for the aryl moieties in the polymer. The value for X is 1 through 4 with up to five bromines present on the terminal group. The value for n is any number that provides an effective flame retardant polymer. Preferable values for n are from about 3 to about 300.

The most preferred embodiment of the present invention includes the compound of the following general formula:

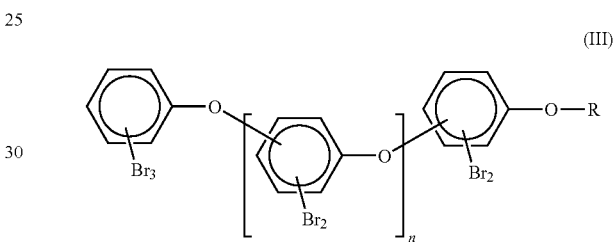

wherein R is hydrogen, alkali or alkaline earth metals, n is about 3 to about 300, and the product is ortho and/or para substituted, or a mixture thereof.

The compounds of this invention can be produced by processes that provide flame retardant material of high purity with a low tribromophenol (TBP) content of less than 500 parts per million (ppm) and low ionic impurities of less than 100 ppm. The process of the current invention eliminates the need for a separate washing clean-up step.

Preferably, the polybromoaryl ether prepared by the process of the current invention has from 0 to 200 (ppm) sodium bromide remaining. Most preferably, from 0 to 50 ppm sodium bromide is remaining in the polybromoaryl ether prepared by the process of this invention.

The process of the present invention results in a polymer composition having a controlled molecular weight distribution compared to material made by historical aqueous-based processes. The process of the current invention results in a polymer composition of molecular weights ranging from 10,000 to 62,000 Daltons. Polymer compositions of lower molecular weights, in the range of approximately 700 to 10,000 Daltons, are also possible by modification of this process.

The process of the present invention preferably utilizes solvents that provide solubility for the product polymer, and yet are non-solvents for the bromide metal salt co-product. Preferred solvents are ethers. Examples of ethers used in the process of the present invention include, among others, anisole, dibenzyl ether, tert-butyl methyl ether, cyclopentyl methyl ether, dibutyl ether, diethyl ether, dihexyl ether, diisopropyl ether, 1,2-dimethoxyethane, 1,4-dioxane, 1,3-dioxolane, diphenyl ether, 2-methyltetrahydrofuran, tetrahydrofuran, and tetrahydropyran. Most preferably, the solvent is tetrahydrofuran.

The bases of the present invention are those that can react with Structure I to produce a phenolic salt by reaction with the phenolic proton of Structure I. General classes of bases include, but are not limited to, amines, carbonates, alkoxides, alkali metal amides, hydrides, and carbanions. Examples of bases used in the process of the present invention include, among others, lithium carbonate, potassium carbonate, sodium carbonate and lithium hydroxide, potassium hydroxide, sodium hydroxide, lithium phosphate, potassium phosphate, and sodium phosphate. Preferably the base is sodium hydroxide.

Initiators used in the present invention are diaroyl peroxides. Examples of initiators used in the process of the present invention include, among others, benzoyl peroxide, bis(4-chlorobenzoyl)peroxide, di(2,4-dichlorobenzoyl)peroxide, 2-methylbenzoyl peroxide, and 4-methylbenzoyl peroxide. Preferably, the initiator is benzoyl peroxide.

A desirable embodiment of the process of the current invention is that in which the solvent is from about 100 wt % to 600 wt % tetrahydrofuran as based on compound I, the alkali metal hydroxide is from about 100 mol % to 120 mol % sodium hydroxide as based on compound I, and the polymerization initiator is from about 0.1 mol % to 30 mol % benzoyl peroxide as based on compound I.

Desirable embodiments of the current invention are that in which from 30.0 mol % to 0.5 mol % of benzoyl peroxide is reacted to result in the polybromoaryl ether having a molecular weight ranging from 4,000 to 62,000 Daltons or from 3.0 mol % to 1.0 mol % of benzoyl peroxide is reacted to result in said polybromoaryl ether having a molecular weight ranging from 15,000 to 40,000 Daltons.

The present invention provides a polymer composition with improved thermal stability compared with brominated polystyrene and commercial PO-64P flame retardants. Use of the flame retardants of this invention can be in any polyamide resin at a reduced bromine load-level when compared with other brominated flame retardants, particularly brominated polystyrenes. Such a load level is less than the level required by brominated polystyrenes, but still able to achieve a UL-94 V-O flame retardant rating, indicating that an improved efficiency is obtained by using the flame retardant of the invention.

Desirable polyamide resins for use with the invention include polyamide-6 and polyamide-6,6 and blends thereof, but they also include those polyamides having melt temperatures above 280° C. Examples of such polymer compositions include polyamide-4,6, polyamide-4,8, polyamide-4,9, polyamide-4,10, polyamide-4,11, polyamide-4,12, polyamide-4,13, polyamide-4,14 and the semi-aromatic polyamides such as polyamide-6,6/6T, polyamide-4,6/4T/4I, polyamide-9T, polyamide-12T, and various blends of any of these resins, or alloys and blends of these resins with other thermoplastic resins.

Preferably, the polybromoaryl ether prepared by the present invention provides a polymer composition with thermal stability, determined by the mass loss rate value in percent per minute, in the first 20 minutes of a 330° C. isothermal thermogravimetric analysis (TGA) of 0.01 percent per minute to 0.20 percent per minute. Most preferably, the polybromoaryl ether prepared by the present invention provides a polymer composition with a mass loss rate value in the first 20 minutes of a 330° C. isothermal thermogravimetric analysis of 0.01 percent per minute to 0.10 percent per minute.

The compound of the current invention can be used with other additives that are desirable to use in preparing the final polymer composition. These other additives can include fillers, impact modifiers, reinforcing agents such as glass fiber, colorants, stabilizers such as hydrotalcite, flow enhancers, flame-retardant aids, and synergists such as antimony compounds, zinc compounds, and others known by one experienced in the art.

A desirable embodiment of the composition of the current invention comprises about 20 wt % to 90 wt % polyamide resin, about 0 wt % to 60 wt % inorganic reinforcing agent or filler, about 5 wt % to 30 wt %.polybromoaryl ether, about 0 wt % to 15 wt % synergist, about 0 wt % to 5 wt % mold release, and about 0 wt % to 5 wt % drip suppressant.

The resin compositions used in the present invention can be prepared by a variety of methods such as solution blending and melt blending. However, the melt blending method is preferred. Examples of melt blending equipment include twin screw extruders, single screw extruders, Banbury mixers, roll mixers, kneaders, etc. However, melt blending using a twin screw extruder is preferred. The melt blending temperature depends on the resin being used and is within the range from 150° C. to 400° C.

When using an extruder for melt blending, in some instances, the extrudate exits through small die holes, and the strands of molten composition are cooled by passing through a water bath. The cooled strands can be pelletized. The pellets can be used to prepare molded articles. In some instances, it is necessary to dry the composition prior to molding.

Flame retardant polyamide compositions of the invention provide improved thermal stability. This results in compositions that provide reduced mold deposit or "outgassing" of the product during injection molding relative to compositions based on brominated polystyrenes. This is because there is much reduced degradation of the material under the high heat conditions of injection molding. Another manifestation of having improved thermal stability is that the materials made with the compositions would exhibit less tendency to form blisters on the parts during the solder reflow process.

Flame retardant polyamide compositions of the invention also provide improved mechanical properties relative to compositions based on brominated polystyrenes because of the improved flame retardant efficiency and reduced flame retardant load level that are required by using the invention. The improved mechanical properties may also result from the flame retardant of the present invention having improved compatibility with the host polyamide resin.

The current invention also provides improved polymer color relative to the polymer prepared by previous methods, in particular the aqueous-based process to produce "PO-64P." Desirable color for the polybromoaryl prepared by the current invention is an APHA color range from 1 to 300.

The current invention can be used in other resins requiring flame retardancy, including, but not limited to, polyesters such as PBT, or PET, polycarbonates, polyurethanes, polystyrenes and polyolefins, epoxy or alloys and blends of these resins.

The current invention provides an improved product composition based on "masterbatch" formulations of the invention including blends with synergists and/or other resins to improve handling the product in a non-dusting form. Improved product composition masterbatches can also be based on blends of the product of the invention with other brominated or chlorinated flame retardants.

EXAMPLES

Comparative Process 1: Preparation of Polybromoaryl Ether by Historical Aqueous Process To a round-bottom flask equipped with a mechanical stirrer, temperature control, and heating mantle was added 170 g of water, 100 g of tribromophenol, and 12.1 g of sodium hydroxide. The contents were heated to 45° C., and 2.7 g of potassium persulfate ($K_2S_2O_8$) were added to initiate the reaction. The reaction mixture was held between 50° to 80° C. until complete. The reaction slurry was filtered to isolate the product. The product was rinsed and dried as needed to afford Compound 1.

Comparative Process 2: Preparation of Polybromoaryl Ether by Two-Phased Water-Solvent Process To a round-bottom flask equipped with a mechanical stirrer, temperature control and heating mantle was added 170 g of water, 100 g of tribromophenol, and 12.1 g of sodium hydroxide. Next, 250 g of chloroform were added, and the mixture was heated to 45° C. Potassium persulfate ($K_2S_2O_8$, 2.7 g) was added, and the reaction mixture was held between 55° and 80° C. until complete. The organic and aqueous layers emulsified. The emulsion could not be completely broken. The product/chloroform phase that was isolated was fed into a suitable non-solvent to precipitate the product. The product was isolated by filtration and drying.

Comparative Process 3: A Preparation of Polybromoaryl Ether by an Alternate Two-Phased Water Solvent Process To a round-bottom flask equipped with a mechanical stirrer, temperature control, and heating mantle were added 170 g of water, 100 g of tribromophenol, and 12.1 g of sodium hydroxide. The contents were heated to 45° C., and 2.7 g of potassium persulfate ($K_2S_2O_8$) were added. The reaction mixture was held between 55° and 80° C. until complete. After the reaction, chlorobenzene (395 g) was added and stirred for 5 to 60 minutes. The organic and aqueous layers were phase separated, and the product/chlorobenzene mixture was fed into a suitable non-solvent to precipitate the product. The product was isolated by filtration and drying.

Comparative Process 4: Preparation of Polybromoaryl Ether by an Alternate Two-Phased Water Solvent Process To a round-bottom flask equipped with a mechanical stirrer, temperature control and heating mantle were added 400 g of toluene, 100 g of tribromophenol, and 12.1 g of sodium hydroxide. Benzoyl peroxide (1.4 g) was added, and the reaction mixture was held at 80° C. until complete. A quenching agent was added, and the reaction mixture was cooled. Deionized water (50 g) was added, and the mixture was stirred for 5 to 60 minutes. The layers were phase separated, and the organic toluene layer was fed into a suitable non-solvent to precipitate the product. The product was isolated by filtration and drying.

Comparative Process 5: Preparation of Polybromoaryl Ether by the Tetrahydrofuran Process of the Current Invention This preparation used tetrahydrofuran ("THF") as the reaction solvent. Tetrahydrofuran (675 g) was added to a round-bottom flask equipped with a mechanical stirrer, temperature control, and heating mantle. Tribromophenol (450 g), sodium hydroxide (54 g), and benzoyl peroxide (6.6 g) were sequentially added. The reaction was held at reflux until complete. A suitable quenching agent was added, and the mixture was filtered to remove the sodium bromide by-product. The product-tetrahydrofuran solution was precipitated in a suitable non-solvent to isolate the product. The product was filtered and dried to give Compound 2 (yield=94%).

Comparative Process 6: Preparation of Polybromoaryl Ether of Lower Molecular Weight by the Tetrahydrofuran Process of the Current Invention This preparation used tetrahydrofuran ("THF") as the reaction solvent to achieve polybromoaryl ether with a low molecular weight. Tetrahydrofuran (1200 g) was added to a round-bottom flask equipped with a mechanical stirrer, temperature control, and heating mantle. Tribromophenol (600 g), sodium hydroxide (73 g), and the appropriate level of benzoyl peroxide were sequentially added. The reaction was held at reflux until complete. A suitable quenching agent was added, and the mixture was filtered to remove the sodium bromide by-product. The product-tetrahydrofuran solution was precipitated in a suitable non-solvent to isolate the product. The product was filtered and dried to give Compound 3a through 3d. Yield=85-90%.

TABLE 1

Preparation of Polybromoaryl Ether of Various Molecular Weights

|  | Trial 1 Compound 3a | Trial 2 Compound 3b | Trial 3 Compound 3c | Trial 4 Compound 3d |
|---|---|---|---|---|
| Mole % Benzoyl Peroxide* | 15 | 7 | 4 | 2 |
| $M_w$, Daltons | 4700 | 6300 | 16000 | 25000 |
| $M_w/M_n$ | 1.8 | 2.0 | 2.5 | 3.4 |

*Based on moles of tribromophenol

As shown in Table 1, using the process of the current invention, it is possible to control the molecular weight of the resulting polybromoaryl ether by adjusting the amount of benzoyl peroxide used.

Comparative Example 1

Comparison of Properties of Polybromoaryl Ether Made by the Three Different Processes A comparison of the properties of the different polybromoaryl ethers from preparation by (a) the historical aqueous process (Comparative Process 1), (b) a two-phased water-solvent process (Comparative Process 2), (c) an alternate two-phased water solvent process (Comparative Process 3), (d) an alternate two-phased water solvent process (Comparative Process 4), and (e) the tetrahydrofuran process of the current invention (Comparative Process 5) are given in Table 2.

TABLE 2

Properties of Polybromoaryl ethers

|  | Aqueous Process COMP. 1 | Two-Phased Water Solvent Process COMP. 2* | Alternate Two-Phased Water Solvent Process COMP. 3 | Alternate Two-Phased Water Solvent Process COMP. 4 | Tetrahydrofuran Process COMP. 5 |
|---|---|---|---|---|---|
| Sodium Bromide, ppm | 31100 |  | 20000 | 229 | 14 |
| Tribromophenol, ppm | 40200 |  | 1935 | 950 | 188 |
| Molecular Weight, Daltons | 4000 | 36000 | 6900 | 6500 | 32000 |
| Polydispersity | 2.6 | 2.7 | 1.9 | 2.3 | 2.9 |

*Mixture emulsified

Table 2 illustrates the differences in molecular weights of the polybromoaryl ether compounds resulting from the different processes used and the levels of impurities, sodium bromide, and tribromophenol present in the compounds. Additionally, the resulting compound of the process of the current invention results in a much lower level of impurities than any of the other processes for preparing polybromoaryl ethers.

Compounding of Polybromoaryl Ether into Polyamide Resin

Polyamide compositions are prepared by using a twin-screw extruder at a temperature of about 280° C. to about 330° C., depending on the resin requirements. The resultant compositions were molded on an injection molding machine at a temperature of about 280° to about 330° C., depending on the resin being used. The mold temperature was set at about 80° to about 120° C.

Example 1

Thermal Stability of Various Flame Retardant Materials

The thermal stability of the flame retardant materials of the current invention as made by the tetrahydrofuran process of Comparative Process 5, above, is shown in Table 3 (Compound 2). The thermal stability is measured by the mass loss rate (MLR) at 330° C. in an isothermal thermogravimetric analysis ("TGA") experiment over 20 minutes. Lower mass loss rate values represent increased thermal stability. Compound 2, made by the process of the current invention is compared with polybromoaryl ether made by the aqueous process of Comparative Process 1 (Compound 1), a tribromophenol polymer (such as that marketed under the trade name Uniplex FRP-64P ("FRP-64P")) and a brominated polystyrene-type flame retardant ("BPS") (such as that marketed under the trade name Saytex 3010). Compound 2 has the lowest mass loss rate MLR value and therefore the highest thermal stability of the flame retardant materials compared.

TABLE 3

Thermal Stability of Different Flame Retardant Materials by Isothermal TGA

|  | Compound 1 | Compound 2 | FRP-64P | BPS |
|---|---|---|---|---|
| Neat Flame Retardant Mass Loss Rate (percent/min) 330° C. | 0.26 | 0.054 | 0.316 | 0.385 |

The mass loss rate values for the flame retardant comprising Compound 2, prepared by the process of the current invention, are much lower than those for the material made by other processes or for a brominated polystyrene material. This indicates that the use of the compound prepared by the process of the current invention would have better thermal stability during processing, which would lead to less "off-gassing" during an injection molding operation. Off-gassing is an issue with processing of some higher temperature resins because it leads to a build up of deposits of material on the surface of the molds, which causes imperfections in the molded parts and eventual plugging of the vent lines with condensed off-gas residues.

Example 2

Thermal Stability of Polyamide Formulations Containing Various Flame Retardant Materials The thermal stability of the flame retardant materials in a 30 percent glass-reinforced PA6T/66 polyamide formulation is shown in Table 4. The data show the improvement in the overall thermal stability of formulations using the Compound 2, prepared by the process of the current invention. The data in Table 4 confirm the Mass Loss Rate data discussed above for the Neat Flame Retardant Compounds. The formulation containing Compound 2, prepared by the process of the current invention, has the lowest value and therefore the highest thermal stability of the flame retardant materials compared.

TABLE 4

Thermal Stability of 30 Percent Glass Reinforced PA 6T/66 Formulations by Isothermal TGA

| | Flame Retardant Used in Formulation | | |
|---|---|---|---|
| | Compound 2 | FRP-64P | BPS |
| Formulation Mass Loss Rate (%/min) @ 330° C. | 0.070 | 0.217 | 0.120 |

Table 5 presents mass loss rate data for flame retardants tested in a 30 percent glass reinforced PA 6,6 formulation.

TABLE 5

Thermal Stability of 30 Percent Glass Reinforced PA 6,6 Formulations by Isothermal TGA

| | Flame Retardant Used in Formulation | |
|---|---|---|
| | Compound 2 | FRP-64P |
| Formulation Mass Loss Rate (%/min) @ 300° C. | 0.061 | 0.142 |

As with the previous formulations tested, Compound 2 has the lowest mass loss rate value and therefore better thermal stability in the 30% glass reinforced PA 6,6 formulation.

The thermal stability of a 30 percent glass-reinforced PA 4,6 polyamide formulation containing Compound 2 as the flame retardant was also determined by the isothermal TGA method at 320° C. to be 0.12% per minute.

These examples demonstrate the wide-range improvement in thermal stability of formulations containing the flame retardant material of the present invention by showing a high-temperature polyamide and a standard PA 6,6 polyamide resin formulation.

Example 3

Blister Resistance of High Temperature Polyamide Formulations Using Polybromoaryl Ether as the Flame Retardant In many connector applications involving surface-mount technology, the use of lead-free solder results in higher processing temperatures. This use sometimes results in polyamide parts forming blisters on the surface. The use of the flame retardant compound of the current invention improves the blister performance as shown in Table 6.

The blister resistance was determined by exposing the molded part to high levels of humidity for a specified period of time and then passing the specimen through a solder reflow oven using different peak reflow temperatures at 5° C. increments. The reflow oven temperature profile is based on what is described in the IPC/JEDEC J-STD-020C joint industry standard. The blister resistance temperature was noted as the highest temperature at which no blisters formed. The formulations containing Compound 2 show an improvement in blister resistance performance compared to a brominated polystyrene resin formulation.

TABLE 6

Blister Resistance Temperatures of 30% Glass Reinforced PA6T/66 Formulations

| | Flame Retardant used in Formulation | | |
|---|---|---|---|
| | Base resin | Compound 2 | BPS |
| Blister Resistance (° C.) | >280 | 265 | 245 |

As shown in Table 6, the formulation comprising Compound 2 as the flame retardant resulted in maintaining a higher blister resistance temperature than that of a brominated polystyrene type flame retardant. This improvement in blister resistance may be related to the improved compatibility seen with this flame retardant compared to the brominated polystyrenes.

The trend also holds true with other high-temperature polyamide resins as shown in Table 7.

TABLE 7

Blister Resistance Temperatures of Other 30% Glass Reinforced PA Formulations

| | PA9T Formulation | PA4,6 Formulation |
|---|---|---|
| Base Resin | >280° C. | 240° C. |
| Compound 2 | 280° C. | 230° C. |
| BPS | 265° C. | 225° C. |

The PA9T resin, which is known for having very high blister resistance alone, shows that the addition of Compound 2 as the flame retardant does not lower the blister resistance value. The PA4,6 resin system, known for having a fairly low blister resistance value is just slightly improved with the addition of Compound 2 compared to the brominated polystyrene flame retardant.

Example 7

Comparison of Resin-Flame Retardant Compatibility

The use of the compound of the current invention shows improved compatibility with the host polyamide resin. The Scanning Electron Micrograph (SEM) images of FIG. 1 illustrate that Compound 2, prepared by the process of the current invention, is more uniformly distributed throughout the polyamide resin when compared to a brominated polystyrene type material. Note the formation of spheres of flame retardant domains in the BPS formulation compared with the more uniformly distributed formulation for Compound 2.

The uniform distribution of Compound 2 is likely responsible, in part, for improving such properties as weld line tensile strength, tensile elongation, blister resistance, and also providing non-blooming properties discussed previously. These are critical properties in the connector market where parts tend to be fairly small and can be subject to higher processing temperatures.

Example 8

Product Color Comparisons

Lightly colored flame retardants for the preparation of lightly colored flame retardant resin formulations are highly desired in the industry. The process of the current invention produces a product with lighter inherent color than that produced by the aqueous process. The APHA color method used required dissolving 1.0 g of sample in 50 milliliters of tetrahydrofuran ("THF"). The color value was determined using a HunterLabs Colorquest II instrument. Comparative APHA color data are shown in Table 8 for a series of reactions using either the aqueous or the tetrahydrofuran process. As shown in Table 8, the APHA color values for the samples prepared by the process of the current invention are much lower, and therefore much lighter than the samples prepared by the aqueous process.

TABLE 8

Color of Product Made with Different Processes

| Sample Number | Process | APHA color |
|---|---|---|
| Sample 1 | Water | >500 |
| Sample 2 | Water | >500 |
| Sample 3 | THF | 176 |
| Sample 4 | THF | 238 |
| Sample 5 | THF | 260 |
| Sample 6 | THF | 171 |
| Sample 7 | THF | 167 |

We claim:

1. A process for preparing a polybromoaryl ether comprising:
   (A) adding to a solvent for the polybromoaryl ether a mixture of:
      (1) at least one compound of the structure HO—Ar—$X_1X_2X_3X_4X_5$  (I)

wherein Ar is an aryl group and $X_1$ $X_2$ $X_3$ $X_4$ and $X_5$ are independently selected from the group consisting of hydrogen and bromine, provided that at least one of $X_1$ $X_2$ $X_3$ $X_4$ and $X_5$ is bromine,
      (2) at least one alkali or alkaline metal hydroxide, and
      (3) at least one polymerization initiator,
      wherein said solvent for the polybromoaryl ether is a non-solvent for alkali or alkaline metal bromides;
   (B) mixing the materials prepared in (A) to polymerize compound I and form the polybromoaryl ether and at least one alkali or alkaline metal bromide by-product;
   (C) quenching the polymerization of compound I; and then
   (D) separating the insoluble alkali or alkaline metal bromide by-product using filtration from the soluble polybromoaryl ether.

2. The process of claim 1 wherein said solvent is tetrahydrofuran.

3. The process of claim 1 wherein:
   said solvent is from about 100 wt % to 600 wt % tetrahydrofuran as based on compound I;
   said alkali metal hydroxide is from about 100 mol % to 120 mol % sodium hydroxide as based on compound I; and
   said polymerization initiator is from about 0.1 mol % to 30 mol % benzoyl peroxide as based on compound I.

4. The process of claim 1 wherein from 30.0 mol % to 0.5 mol % of benzoyl peroxide is reacted to result in said polybromoaryl ether having a molecular weight ranging from 4,000 to 62,000 Daltons.

5. The process of claim 1 wherein from 3.0 mol % to 1.0 mol % of benzoyl peroxide is reacted to result in said polybromoaryl ether having a molecular weight ranging from 15,000 to 40,000 Daltons.

* * * * *